(12) United States Patent
Baker et al.

(10) Patent No.: US 8,248,297 B1
(45) Date of Patent: Aug. 21, 2012

(54) PHASE NOISE MEASUREMENT SYSTEM AND METHOD

(75) Inventors: John Baker, South Setauket, NY (US); Eli Levi, Dix Hills, NY (US)

(73) Assignee: Advanced Testing Technologies, Inc., Hauppauge, NY (US)

( * ) Notice: Subject to any disclaimer, the term of this patent is extended or adjusted under 35 U.S.C. 154(b) by 0 days.

(21) Appl. No.: 13/236,869

(22) Filed: Sep. 20, 2011

Related U.S. Application Data

(60) Provisional application No. 61/473,886, filed on Apr. 11, 2011.

(51) Int. Cl.
  *G01S 13/00* (2006.01)
  *G01S 7/40* (2006.01)
(52) U.S. Cl. ........ 342/169; 342/159; 342/165; 342/173; 342/174
(58) Field of Classification Search .............. 342/13–20, 342/159–161, 165, 169, 173, 174; 324/76.23, 324/613, 617, 620, 622
See application file for complete search history.

(56) References Cited

U.S. PATENT DOCUMENTS

| | | | | |
|---|---|---|---|---|
| 4,713,662 A * | 12/1987 | Wiegand | .................... | 342/13 |
| 4,714,873 A * | 12/1987 | McPherson et al. | .......... | 324/613 |
| 4,743,905 A * | 5/1988 | Wiegand | .................... | 342/14 |
| 4,788,547 A * | 11/1988 | Jones et al. | .................... | 342/100 |
| 4,885,587 A * | 12/1989 | Wiegand et al. | ................ | 342/14 |
| 4,918,373 A * | 4/1990 | Newberg | ..................... | 324/613 |
| 5,053,714 A * | 10/1991 | Durand | ......................... | 324/613 |
| 5,160,264 A * | 11/1992 | Banura et al. | ..................... | 434/2 |
| 5,177,488 A * | 1/1993 | Wang et al. | .................... | 342/167 |
| 5,179,344 A | 1/1993 | Najle et al. | | |
| 5,223,840 A * | 6/1993 | Cronyn | ......................... | 342/170 |
| 5,276,450 A * | 1/1994 | Schwegman | ..................... | 342/16 |
| 5,337,014 A * | 8/1994 | Najle et al. | ..................... | 324/613 |
| 5,412,325 A * | 5/1995 | Meyers | ......................... | 324/613 |
| 5,608,331 A | 3/1997 | Newberg et al. | | |
| 5,770,977 A * | 6/1998 | Uurtamo | ......................... | 331/40 |
| 5,955,993 A * | 9/1999 | Houghton et al. | ............ | 342/417 |
| 6,018,312 A * | 1/2000 | Haworth | ......................... | 342/353 |
| 6,057,690 A * | 5/2000 | Buckley | ......................... | 324/613 |
| 6,211,671 B1* | 4/2001 | Shattil | ............................ | 324/225 |
| 6,346,909 B1* | 2/2002 | Johnson et al. | ............... | 342/169 |
| 6,377,967 B1* | 4/2002 | Wiegand | ........................ | 708/300 |
| 6,392,585 B2* | 5/2002 | Huff et al. | ....................... | 342/16 |
| 6,393,372 B1* | 5/2002 | Rzyski | ........................... | 702/111 |
| 6,480,006 B1* | 11/2002 | Buckley | ........................ | 324/613 |
| 6,621,277 B2* | 9/2003 | Mar | ................................ | 324/622 |
| 6,621,860 B1* | 9/2003 | Yamaguchi et al. | .......... | 375/226 |
| 6,745,020 B2 | 6/2004 | Rzyski et al. | | |

(Continued)

*Primary Examiner* — Jack W Keith
*Assistant Examiner* — Peter Bythrow
(74) *Attorney, Agent, or Firm* — Brian Roffe

(57) ABSTRACT

System that measures absolute or additive phase noise includes a power divider for dividing an input RF signal, a local oscillator, two mixers, each arranged in a path of a respective signal component from the power divider and receiving input from the power divider and local oscillator, two digital radio frequency memories, each associated with a respective mixer and receiving an input signal therefrom, and a digital signal processor that receives signals from the digital radio frequency memories and outputs a digital data stream indicative of measured phase noise. For absolute phase noise measurement, phase noise of the input RF signal is provided. For additive phase noise measurement, a unit under test is arranged in one of the paths between the power divider and the mixer. The system may be interposed between a radar transmitter of a radar environment simulator and a radar receiver coupled to a radar target display.

20 Claims, 8 Drawing Sheets

U.S. PATENT DOCUMENTS

| | | | |
|---|---|---|---|
| 6,795,496 B1* | 9/2004 | Soma et al. | 375/226 |
| 7,035,324 B2* | 4/2006 | Mar et al. | 375/224 |
| 7,302,237 B2 | 11/2007 | Jackson et al. | |
| 7,554,338 B2* | 6/2009 | Nara | 324/613 |
| 7,638,997 B2* | 12/2009 | Ishida | 324/76.77 |
| 7,885,632 B2* | 2/2011 | Wangsness et al. | 455/324 |
| 7,999,551 B2 | 8/2011 | Gard et al. | |
| 8,049,656 B2* | 11/2011 | Shani et al. | 342/14 |
| 8,081,111 B2* | 12/2011 | Haworth | 342/451 |
| 2009/0278733 A1* | 11/2009 | Haworth | 342/357.01 |

* cited by examiner

Absolute Phase Noise Measurement

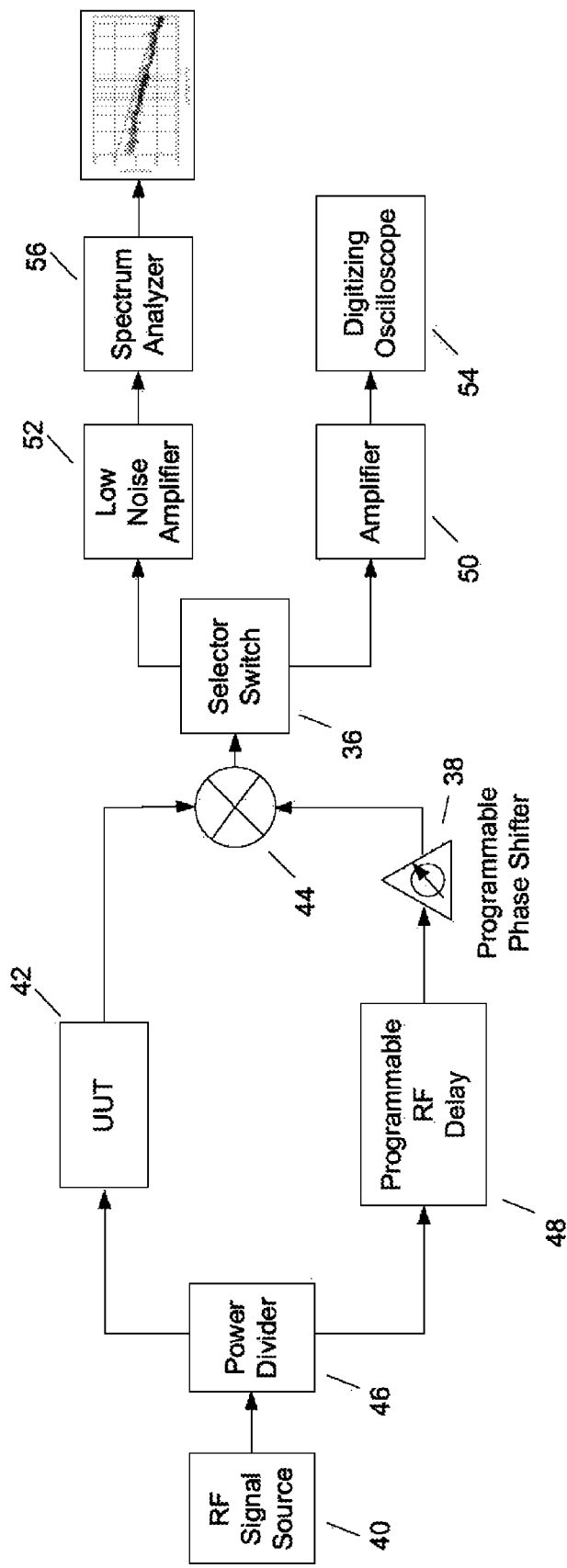

Additive Phase Noise Measurement

Dual DRFM – Digital Domain Noise Analysis

Unit Under Test (UUT)
Path Delay Measurement
Dual DRFM Digital Processing

PHASE NOISE MEASUREMENT SYSTEM AND METHOD

CROSS REFERENCE TO RELATED APPLICATION

This application claims priority under 35 U.S.C. §119(e) of U.S. provisional patent application Ser. No. 61/473,886 filed Apr. 11, 2011, now expired, incorporated by reference herein.

FIELD OF THE INVENTION

The present invention relates generally to systems that measure noise present in radio frequency (RF) signals, and more specifically, to test equipment for use with radar systems components on-board aircraft and in laboratories. Even more particularly, the present invention relates to automatic test systems that measure and enable evaluation of phase noise in radar systems.

The present invention also relates generally to methods for measuring noise present in electronic signals such as radio frequency (RF) signals, and more specifically, to noise measurement methods implemented in test equipment that test radar systems components on-board aircraft and in laboratories. Even more particularly, the present invention relates to methods implemented by automatic test systems to measure and enable evaluation of phase noise in radar systems.

BACKGROUND OF THE INVENTION

Phase noise in radar systems can inhibit target detection due to instabilities that affect a Moving Target Indicator (MTI) function of the radar. Instabilities in the transmitted pulse, RF oscillators, receiver amplifiers and RF signal paths in a radar system can all be sources of phase noise. The total phase noise of a radar system can cause targets to be lost against background clutter returns. This is becoming more critical in military surveillance radar systems due to stealth technology and the increased use of small unmanned aircraft.

Surveillance radar systems use MTI processing to discern targets against clutter returns; however, excessive phase noise can impact clutter cancellation. The phase noise impact on clutter cancellation causes targets to fall below the threshold of detection of the Constant False Alarm Rate (CFAR) of the radar system. This unfortunately results in targets that are invisible to the surveillance system.

It is difficult to measure and quantify the phase noise present in a fully installed and integrated system on-board an aircraft or ship, or other vehicle or vessel. Varying power levels, frequencies and long signal paths make measurement of phase noise using conventional techniques quite challenging. Phase noise measurements are usually confined to individual components prior to the assembly of the radar system. Factory specification of radar subassemblies is intended to ensure that the radar system will have the desired target sensitivity and clutter rejection. It is unlikely, however, that once a component is installed in the radar system that any degradation in phase stability will be detected by ordinary system operation. Over time, a radar operator may notice some difficulty in target detection, but unless a means of quantifying the total system phase noise is employed, the degradation will often go unchecked and the surveillance system could be compromised.

Specification of the allowable phase noise in components for use in the RF oscillator and amplifier sections establish a phase noise floor and target detection sensitivity for the radar system. However, once a radar system is installed and placed into regular service, for example, on-board an aircraft, ship or other vehicle or vessel, the radar system phase noise is not quantified, nor is the impact of phase noise on target detection accurately measured.

OBJECTS AND SUMMARY OF THE INVENTION

It is therefore an object of one or more embodiments of the present invention to provide a system, arrangement and method for quantifying, measuring and/or evaluating phase noise in a radar system and ideally, in the entire radar system. An exemplifying purpose of these measurements is to detect phase noise problems in an installed radar system that contribute to target and/or clutter resolution issues. The invention will measure phase noise and as a result of such measurements, aid in the isolation and replacement of components that are the source of excessive phase noise in radar systems.

It is another object of the invention to be able to quantify phase noise of a radar system after the radar system has been installed and placed into regular service, and used thereat, with a view toward enabling the radar system to be reliably used to its fullest extent and/or in accordance with its design parameters.

In order to achieve one or more of these objects, one embodiment of a phase noise measurement system for a radar system in accordance with the invention utilizes advances in Digital Radio Frequency Memory (DRFM) components, also referred to as Digital Radio Frequency Memory systems, units or devices herein, that provide a means for evaluating radar system sensitivity. A DRFM can be used to simulate radar targets as well as clutter. By simulating the radar system environment and providing targets and clutter that challenge the radar target detection, degradation of phase noise in the radar system can be detected and quantified. Further analysis of these target detection weaknesses can then be performed to determine noise floor and offset frequency impacting the target detection. Diagnosing the source of the problem may be accomplished by, for example, performing an in-situ phase noise measurement of the transmitter and receiver signal paths, and preferably with standard phase noise measurements of the Stabilized Local Oscillator (STALO).

In addition, one or more embodiments of the invention relate to a phase noise test system for evaluating the noise floor of an entire radar system, potentially deployable at the system level and which is capable of making large system phase noise measurements and clutter suppression evaluation of airborne, shipboard and ground based radar systems. The test system uses one or more DRFM devices as part of a phase noise measurement system. As mentioned above, the DRFM device is used as a target/clutter generator to find radar system target detection problems associated with phase noise. The DRFM device is then used as a delay generator for measuring absolute and/or additive phase noise. The DRFM is capable of providing sufficient delay to perform additive phase noise measurements on a large radar system signal path. By measuring radar system signal paths in-situ, the system phase noise measurement provides a means for detecting and isolating phase noise problems that are impacting radar system performance.

BRIEF DESCRIPTION OF THE DRAWINGS

The following drawings are illustrative of embodiments of the invention and are not meant to limit the scope of the invention as encompassed by the claims.

FIG. 5a is a schematic of an additive phase noise measurement (Analog Conventional Method) in accordance with the invention.

DETAILED DESCRIPTION OF THE INVENTION

Figure 1:
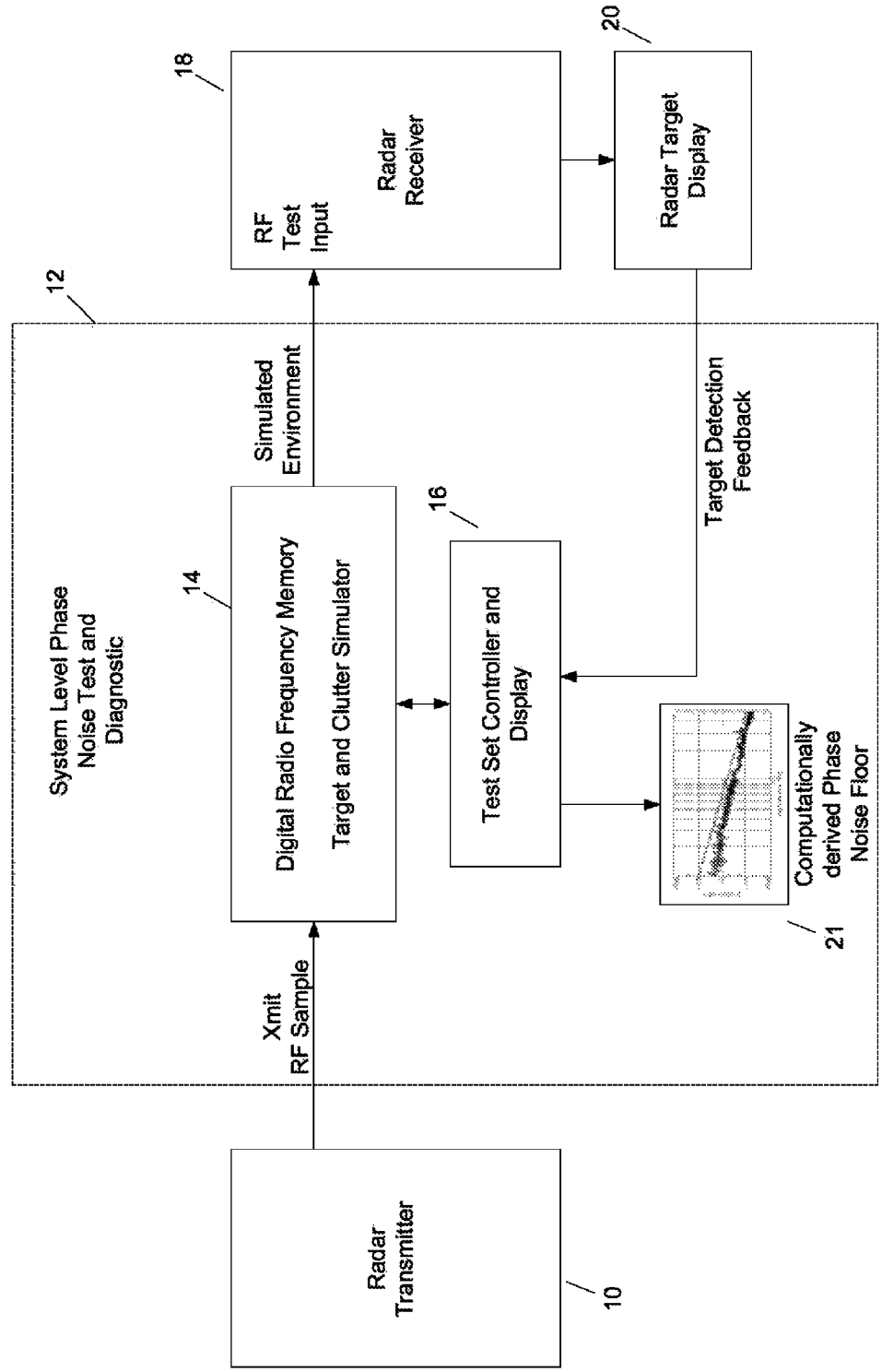
FIG. 1 is a schematic of a DRFM Radar System Target Sensitivity Evaluation system in accordance with the invention.

DRFM Radar Target Sensitivity Evaluation:

Referring to the accompanying drawings wherein like reference numerals refer to the same or similar elements, FIG. 1 illustrates the use of a Digital Radio Frequency Memory (DRFM) as a Radar Target Sensitivity Evaluator. The DRFM provide a means of simulating targets and/or clutter at various radar cross sections and velocities. In an exemplifying use, the DRFM is used to identify one or more target detection weaknesses by simulating targets of various velocities and clutter backgrounds, i.e., a plurality of different combinations of target velocity and clutter background. In these combinations, the target velocity may be constant as the clutter background changes from one simulation to the next, the target velocity may change while the clutter background remains the same from one simulation to the next or both the target velocity and clutter background may change from one simulation to the next. As each target velocity is tested, clutter returns are gradually applied to the signal. The clutter is preferably phase-modulated to simulate various clutter types and is stepped though ranges consistent with radar system application. This technique provides for a measurement of total radar instability that can be translated into the radar system phase noise floor.

By manipulating the radar cross section of the simulated target, the clutter range and the clutter modulation, an instability floor for the radar system can be developed. Instabilities in the Stabilized Local Oscillator (STALO) of the radar result in a range dependent filter characteristic (see, for example, John W. Taylor, Jr, "Radar Handbook", 2$^{nd}$ Edition, "Receivers" McGraw Hill, Boston, Mass. 1990, incorporated by reference herein). The manner in which the instability floor for the radar system can be developed from manipulation of the radar cross section of the simulated target, the clutter range and the clutter modulation in accordance with the invention will be understood by one skilled in the art to which this invention pertains in view of the disclosure herein.

The radar environment simulator shown in FIG. 1 includes a radar transmitter 10, and a system level phase noise test and diagnostic unit 12 that receives a transmitted RF sample from the radar transmitter 10. The system level phase noise test and diagnostic unit 12 includes a digital radio frequency memory unit 14 that receives the transmitted RF sample, and a test set controller and display unit 16 that is coupled to the digital radio frequency memory unit 14 for bi-directional signal and/or data flow. Thus, during operation, there may be one or more signals carrying or indicative of data that pass from the digital radio frequency memory unit 14 to the test set controller and display unit 16 and/or one or more signals carrying or indicative of data that pass from the test set controller and display unit 16 to the digital radio frequency memory unit 14 to provide the bi-directional signal and data flow. The system level phase noise test and diagnostic unit 12 is configured to generate and output a simulated environment to an RF test input of a radar receiver 18. In turn, the radar receiver 18 is configured to generate and provide signals to a radar target display 20 to enable it to display the simulated target and clutter. Based on the displayed target and clutter, target detection feedback can be generated and provided to the test set controller and display unit 16. For example, the feedback may be generated by equipment that analyzes the efficiency of the target detection and signals indicative of this analysis directed to the test set controller and display unit 16. Feedback might also be generated by personnel and converted by a user interface into signals to be directed to the test set controller and display unit 16.

The components illustrated in FIG. 1 can be connected to one another, via output and input ports and connectors and other electronic device connection structure known to those skilled in the art, to provide the system shown therein. These connections are generally cables, wires and the like. The separation of different components into the blocks does not imply that the separate components are physically separated from one another and two or more of the components, although shown in different blocks, may be integrated into a common piece of electronic hardware.

Figure 2:
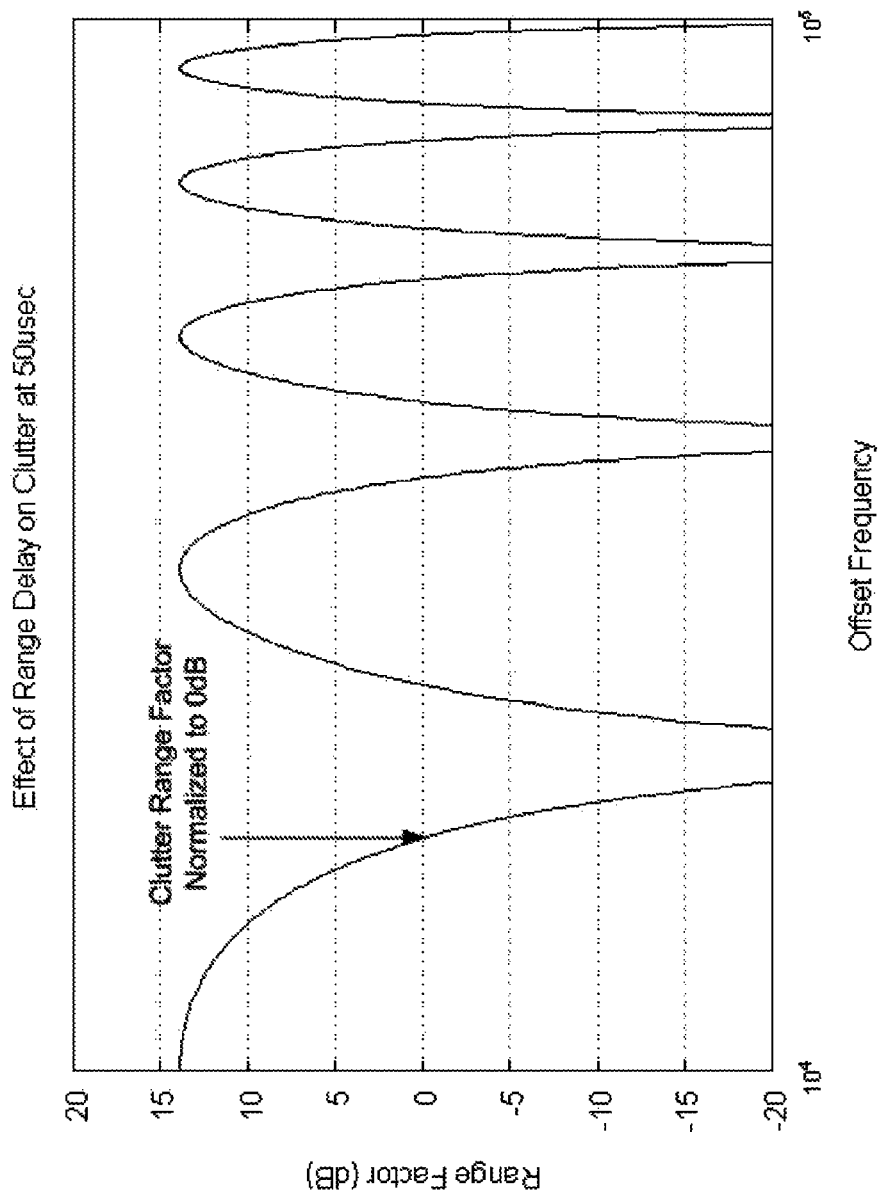
FIG. 2 is a plot showing the effect of Range Delay at 50 nSec.
Figure 3:
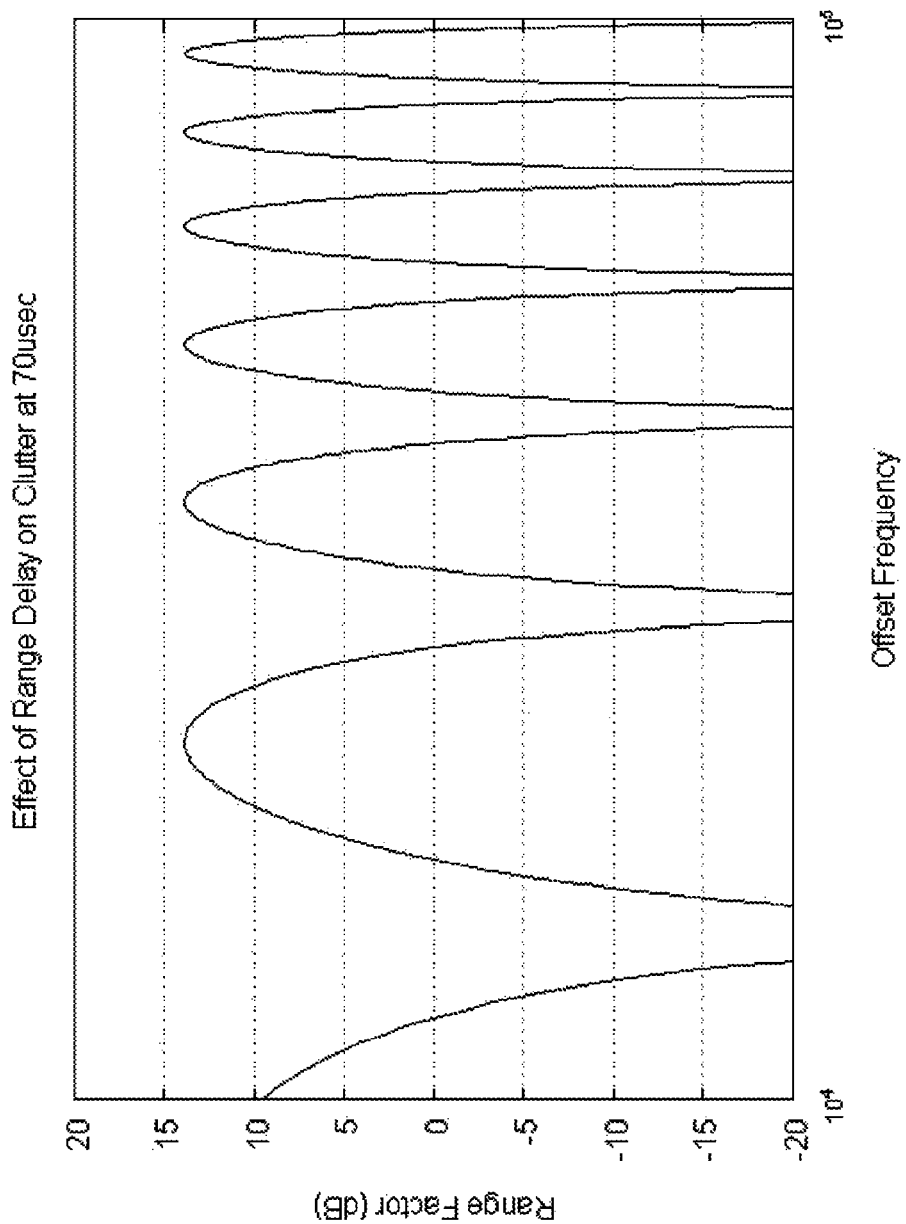
FIG. 3 is a plot showing the effect of Range Delay at 70 nSec.

In the measurement system of the invention, structure is configured to provide for adjustment of the clutter range during the measurement, thereby strategically placing the simulated clutter to identify and pinpoint phase noise instabilities. Suitable structure that enables adjustment of the cutter range, e.g., an adjustment button, knob, selector, and the like, would be readily identifiable by those skilled in the art to which this invention pertains in view of the disclosure herein. By taking advantage of this range dependence, the measurement system can measure the impact of phase noise uniformly throughout the modulation frequency ($f_m$) range. The relationship between range, clutter cancellation and modulation may be expressed as:

$$dB_{RangeFactor}=10 \log 4 \sin^2(2 \pi f_m \cdot R/c)$$

wherein:
$f_m$=modulation frequency in Hz
R=Range in meters
c=propagation velocity, $3 \times 10^8$ m/s yielding the plots shown in FIGS. 2 and 3. These plots illustrate the effect of range on clutter cancellation. FIG. 2 is a plot of the Clutter Range Factor for a delay of 50 μSecs. FIG. 3 is a plot of the Clutter Range Factor for a delay of 70 μSecs. At each point the plot crosses 0 dB, the clutter factor is normalized. With the clutter factor normalized at 0 dB, the simulated clutter return can be manipulated to determine the effective phase noise floor for that offset frequency.

The test set controller and display unit 16 is also configured to perform the computation necessary to derive the radar phase noise floor 21 as a function of clutter range factor and loss of target detection. This computation may be performed by software or computer programs in the test set controller and display unit 16, which software or computer program is embodied on non-transitory computer-readable media, and cooperates with hardware, e.g., a processor, to achieve the function of deriving the phase noise floor 21.

Figure 4:
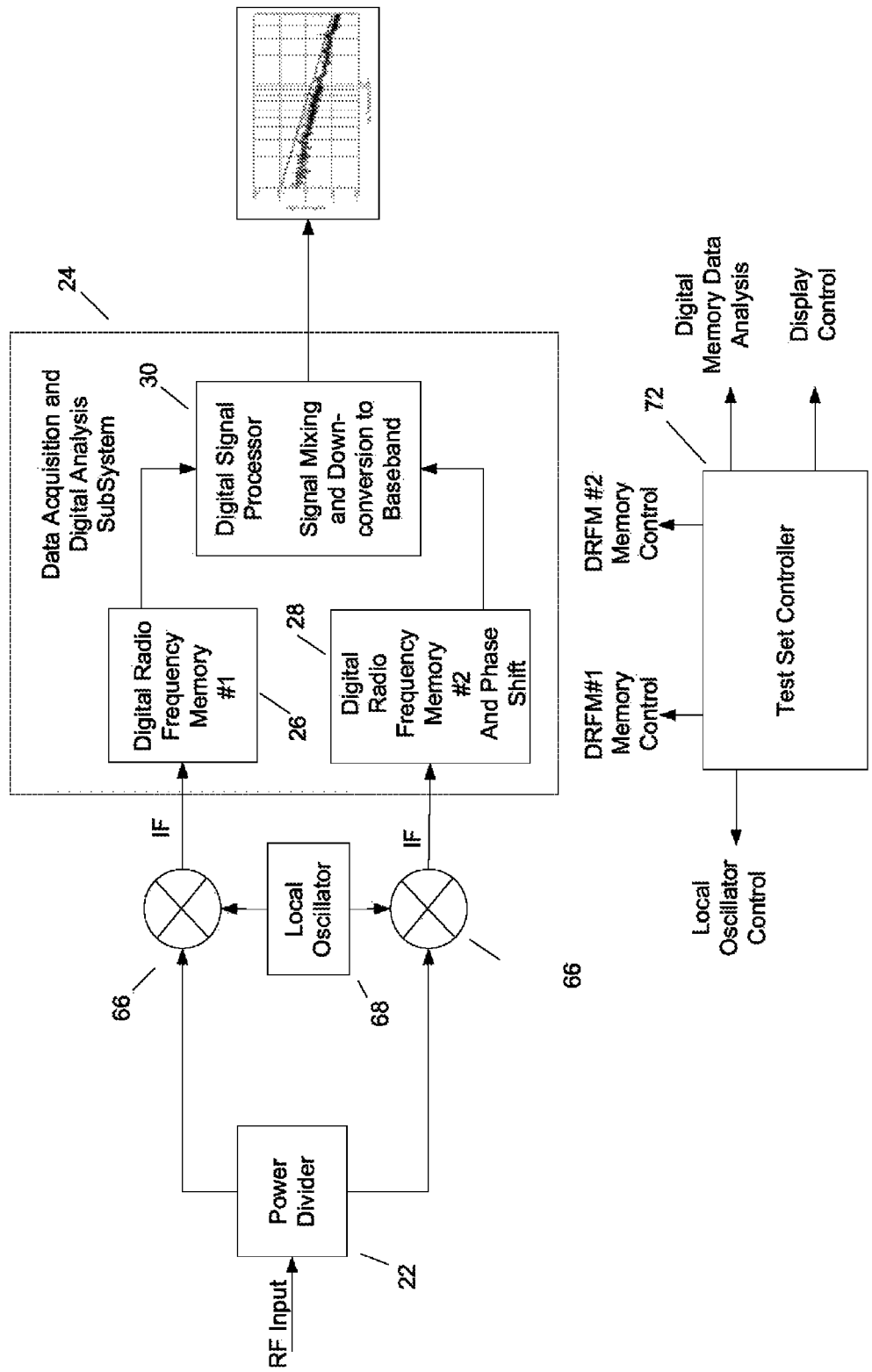
FIG. 4 is a schematic of an absolute phase noise measurement system in accordance with the invention.

Absolute Phase Noise:

Referring now to FIG. 4, FIG. 4 is a block diagram of an absolute phase noise system in accordance with the invention. The components represented by the blocks are electronic components generally known to those skilled in the art to which this invention pertains. The components can be connected to one another, via output and input ports and connectors and other electronic device connection structure known to those skilled in the art, to provide the system shown in FIG. 4. These connections are generally cables, wires and the like. The separation of different components into the blocks does not imply that the separate components are physically separated from one another and two or more of the components, although shown in different blocks, may be integrated into a common piece of electronic hardware.

A signal to be tested, RF input, may be a continuous wave output of a radar oscillator, and may be divided by a power divider 22 so that each of the two divided signals or signal components is independently sent along a respective signal path to the Data Acquisition and Digital Analysis SubSystem 24 for de-correlation and phase shifting. The two signals are down converted by mixers 62 and 66 using a common local oscillator 68, with each mixer 62, 66 being arranged in a respective path of the signal component from the power divider 22. The IF signals from the mixers 62, 66 are applied to digital radio frequency memories 26 and 28 inside the Data Acquisition and Digital Analysis SubSystem 24. The Data Acquisition and Digital Analysis SubSystem 24 applies a relative delay to the RF signal of nominally about 1 msec which provides sufficient signal de-correlation for the phase noise measurement. Other relative delays may also be used in the invention. The two digital radio frequency memories 26, 28 within Data Acquisition and Digital Analysis SubSystem 24 are used together to ensure that the pipeline delays of the analog to digital conversion are managed to keep the relative RF delay near the optimal range, i.e., 1 msec in the described embodiment.

Digital radio frequency memory #2, element 28, of the Data Acquisition and Digital Analysis SubSystem 24 is used to apply the necessary phase shift relative to the digitally acquired signal from digital radio frequency memory #1, element 26, of Data Acquisition and Digital Analysis SubSystem 24. The programmed phase shift of digital radio frequency memory #2, element 28, will place the digitally acquired signal either in-phase or in-quadrature, depending on the type of phase noise being measured (AM or PM). The Data Acquisition and Digital Analysis SubSystem 24 provides the necessary phase shift to obtain a peak value (in-phase) to conduct an AM noise measurement or the lowest absolute value (in-quadrature) for PM noise measurement.

The two delayed and phase shifted data streams are applied to a digital signal processor 30 within the Data Acquisition and Digital Analysis SubSystem 24. The digital signal processor 30 performs a digital down-conversion of the two data streams similar to an RF mixer. The result or output is a single digital data stream that represents the down-converted baseband containing the phase noise content of the original analog signal applied to the Power Divider 22, see the sketch of the graph in FIG. 4. This digital baseband is displayed as the measured phase noise content, e.g., on a display included in the system or arrangement. The digital data stream may also be made available for analytical purposes, e.g., via a processing unit or control unit (not shown).

Test set controller 72 would typically include a set of software and hardware components that enables it to convert information provided by or derived from the digital analysis of the radio frequency memories 26, 28 into commands to change the operation of the absolute phase noise measurement system, optionally providing this information to a display. This set of components may include one or more computer programs embodied on computer-readable media. Thus, the test set controller 72 may be used to locate a defective or failing component or a component that is not performing adequately in order to enable its replacement. Commands from the test set controller 72 are directed to several components, including but not limited to, the local oscillator 68 or its control unit (not shown), to the DRFMs 26, 28 in the Data Acquisition and Digital Analysis SubSystem 24.

Figure 5B:
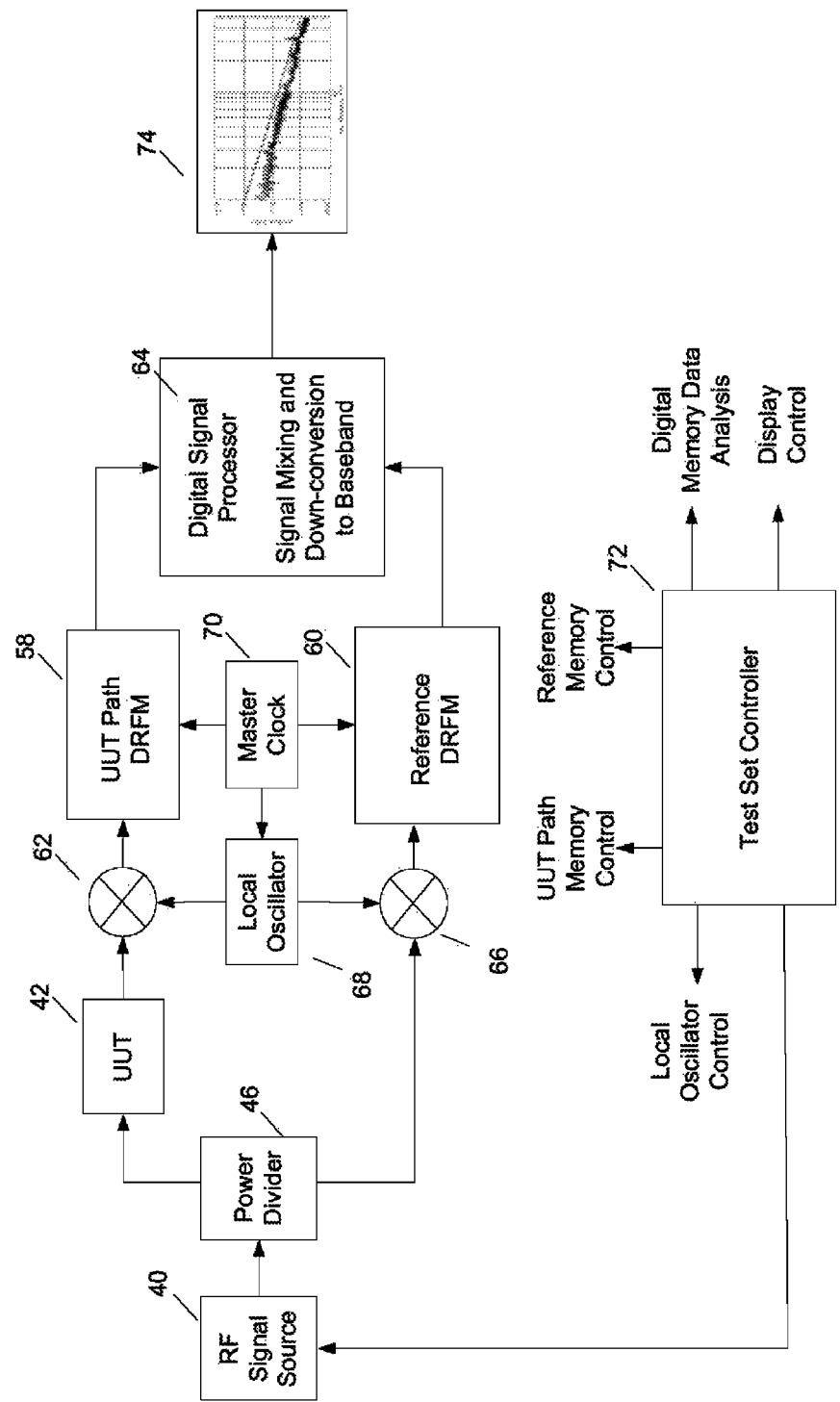
FIG. 5b is a schematic of an additive phase noise measurement (Digital Analysis Method) in accordance with the invention.

Additive Phase Noise:

FIG. 5b is a block diagram of the additive phase noise system in accordance with the invention. By comparison, FIG. 5a illustrates a conventional method of making analog additive phase noise measurements. In a conventional analog additive phase noise measurement system, a test system, or more generally an RF signal source 40, supplies an RF signal and the phase noise added by a unit under test (UUT) 42 is measured. This is accomplished by ensuring that the signal applied to a mixer 44 is correlated. Thus, a power divider 46 divides the RF signal from the RF signal source 40, with one portion being provided to the UUT 42 and another portion to the programmable RF delay unit 48. From the programmable RF delay unit 48, the delayed signal is provided to one port of the mixer 44 while the signal from the UUT is provide to the other input port. The output of the mixer 44 is fed to an amplifier 50 or a Low Noise Amplifier (LNA) 52 and then to either a digitizing oscilloscope 54 for, e.g., test setup alignments and/or directed to a spectrum analyzer 56 for, e.g., phase noise measurement. A selector switch 36 is used to channel the output from the mixer 44 to either the amplifier 50 and the digitizing oscilloscope 54 or to the LNA 52 and spectrum analyzer 56.

The effect of signal correlation is the cancellation of the signal source contribution in the phase noise measurement. Typical additive phase noise measurements use an RF delay line (implemented via the programmable RF delay unit 48) and a programmable phase shifter 38 to match the signal path delay at the mixer 44 and to adjust the reference signal phase for either in-phase (AM) or quadrature (PM) depending on the measurement being taken.

Differing from the conventional additive phase noise measurement depicted in FIG. 5a, in the embodiment of the invention shown schematically in FIG. 5b, two DRFM devices 58, 60 are present, one 58 is applied to the UUT signal path, i.e., interposed between a mixer 62 associated with the UUT 42 and a digital signal processor 64, and the other 60 to the reference signal path, interposed between a second mixer 66 and the digital signal processor 64. The DRFM devices 58, 60 store the captured waveform as in-phase and quadrature (I/O) data, preserving the phase relationships of the two signals. The two DRFM devices 58, 60 applied in this manner allow for matching the signal path to within 10 nSecs and performing digital signal processing to the captured RF data, thereby replicating the phase shift, mixing and spectral analysis functions typical of the analog additive phase noise measurement. The result is a set of data that will depict the additive phase noise present in the UUT path. In addition, a local oscillator 68 provides signals to the LO ports of the mixers 62, 66 and a master clock 70 provides clock signals to the local oscillator 68 and the DRFM devices 58, 60.

The components shown in FIG. 5b can be connected to one another, via output and input ports and connectors and other electronic device connection structure known to those skilled in the art, to provide the system shown therein. These connections are generally cables, wires and the like. The separation of different components into the blocks does not imply that the separate components are physically separated from one another and two or more of the components, although shown in different blocks, may be integrated into a common piece of electronic hardware.

Test set controller 72 would typically include a set of software and hardware components that enables it to convert information provided by or derived from the digital analysis of the radio frequency memory devices 58, 60, e.g., as displayed on a display 74, into commands to change the operation of the additive phase noise measurement system. Thus, the test set controller 72 may be used to locate a defective or failing component or a component that is not performing adequately in order to enable its replacement. Commands from the test set controller 72 are directed to several components, including but not limited to, the RF signal source 40, e.g., to change the RF signals being provided to the power divider 46, to the local oscillator 68 or its control unit (not shown), to the DRFM 58 in the UUT signal path, to the DRFM 60 in the reference signal path, to the display 74 or its control unit (not shown) and/or to the digital signal processor 64.

This method uses high speed digitizing of both the UUT and reference signals and performing digital post processing of the captured data to make the additive phase noise measurement.

Figure 6:
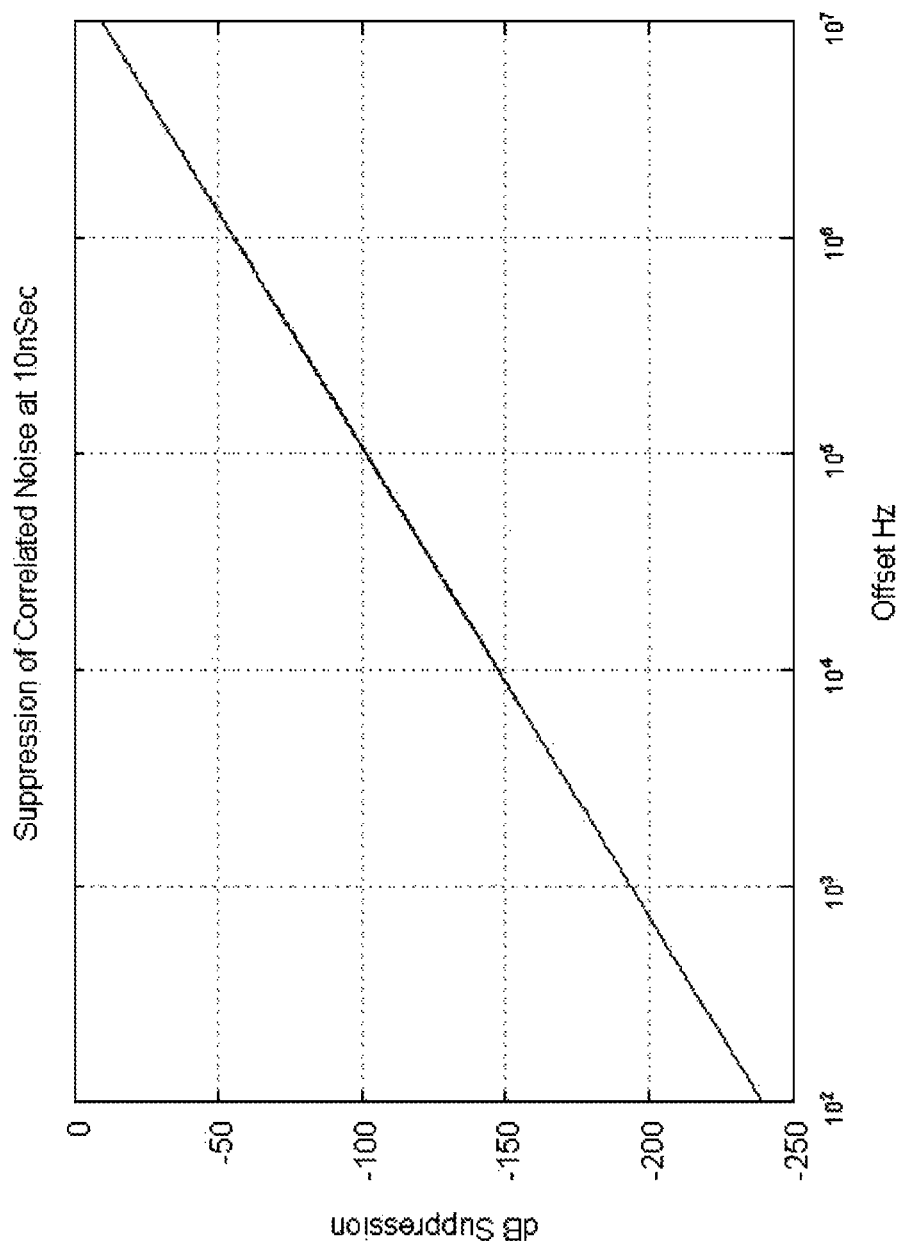
FIG. 6 is a graph showing signal source correlated noise suppression at 10 nSec.

Signal correlation at the baseband mixer results in an effective cancellation of the signal source contribution to the phase noise Spectral Power Density (SPD). This may be defined by:

$$dB_{cancellation} = 20 \, Log \, 2 \, Sin(\pi \cdot fm \cdot t)$$

wherein:
t=time difference between each signal entering the mixer
fm=frequency offset of the noise to the carrier FIG. 6 illustrates the effect of correlating the signal source in phase noise suppression. By suppressing the signal source, the phase noise measurement system will be able to discern the phase noise contributed by the Unit Under Test (UUT). This method aids in the diagnosis and isolation of components that are contributing to the radar system phase noise.

It can be seen that by matching the time delay of the two signal paths to within 10 nSecs, the signal source contribution to the phase noise can be suppressed by more that 30 dB as far out from the carrier as 2 MHz ($10^{63}$).

Unit Under Test Path Delay Measurement:

In order to cancel the source contribution in an additive phase noise measurement, it is necessary to match the propagation delay of the test path very closely. For measurements with an offset frequency of about 1 MHz, matching the test path within about 100 nSecs provides approximately 10 dB suppression of the source contribution. However at an offset frequency of about 2 MHz, a 100 nSec match provides no suppression. This means that it is impossible to distinguish the signal source from the measured path contribution. Suppression of the signal source is therefore essential to the isolation of failed components because if the measurement system floor is not sufficiently low, it is not possible to discern the contribution of the Unit Under Test.

An objective of the invention is to match the Unit Under Test (UUT) path propagation delay to within about 10 nSec.

Figure 7:
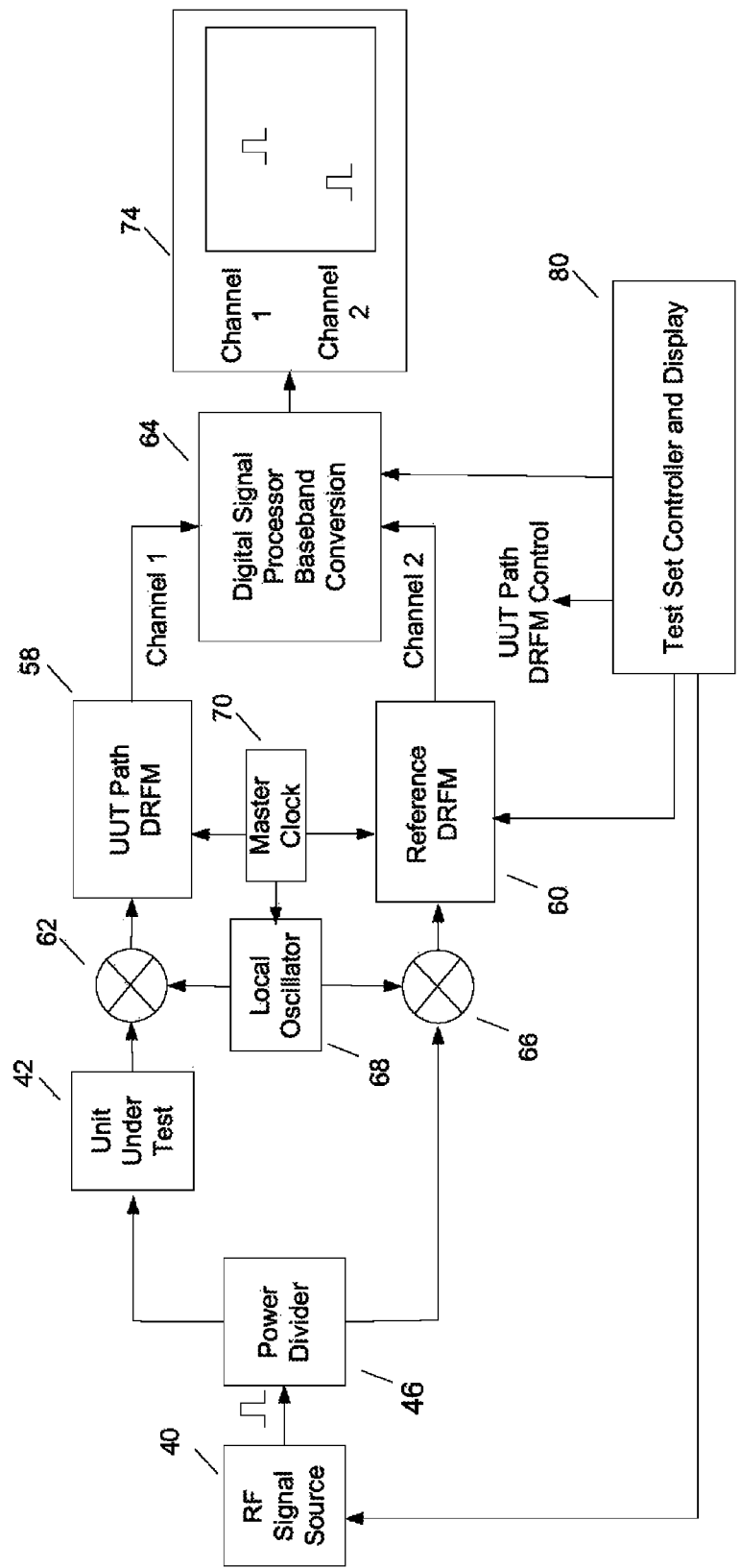
FIG. 7 is a schematic of an RF Path Propagation Delay Measurement system in accordance with the invention.

Since the system path being tested may contain RF amplifiers, mixers, frequency multipliers and other components common in radar systems, the path delay will be measured by injecting a pulse modulated RF signal consistent with the frequency band of the radar system, e.g., from an RF signal source 40 capable of generating a pulse modulated RF signal, see FIG. 7 wherein the same reference numerals designate the same elements as in FIG. 5b.

FIG. 7 illustrates the use of dual DRFM devices 58, 60 to match the Unit Under Test signal path and the Test System signal path. Digital analysis of the radio frequency memory via a digital analysis or radio frequency memory unit 64 provides for a path delay measurement. This allows a test set controller and display 82 to adjust the DRFM delays on both the reference path and UUT signal path to within 10 nSecs of each other. This will allow for the signal source correlation necessary for the additive phase noise measurement.

The foregoing schematically illustrated, electronic systems provide a phase noise measurement system that uses one or more Digital Radio Frequency Memory (DRFM) devices to perform one or more of the following actions:

a) Determine sensitivity of a radar system to targets and clutter by simulating a radar system environment. The simulation of targets at various velocities and/or clutter ranges may be used to identify target detection weaknesses that may be phase noise related. Any target detection weakness/inabilities can be analyzed by personnel or algorithms and related to specific noise floor and offset frequencies. Further diagnosis of the radar system can thus be conducted by measuring system phase noise in both receiver and transmitter elements.

b) Measure absolute phase noise of an RF signal by producing a signal path delay thereby de-correlating a signal source at one input of a mixer/discriminator producing a baseband signal with the resultant phase noise present.

c) Measure additive phase noise in a large system by matching a system delay and thereby correlating a signal source noise contribution and leaving the additive noise of the RF signal path. One or more of the digital radio frequency memory devices are used to capture both the reference and the UUT signal paths synchronously. Digital signal processing (DSP) techniques may be applied to perform signal correlation delay adjustment, phase shift and mixer summation to derive the baseband phase noise. The digital phase noise can then be plotted on a computer display and analyzed, e.g., by the computer system for pass/fail.

These functions may be implemented by software and/or hardware that processes signals or data derived therefrom in a designed manner. To this end, the components may include electronic components such as processors and computer-readable media embodying computer programs to effect the desired functions of the components as described above. Further, algorithms may be used in the invention to implement the method, and in the system and arrangement that applying the method. to cause the components to perform the desired functions described above. These algorithms may be developed in consideration of the objectives of the invention disclosed above.

The foregoing structure evidences conception of an invention in which a power divider receives and divides an input RF signal into two components, each of which is separately directed toward a respective one of two mixers, both of which also receive input from a local oscillator. Two digital radio frequency memories are each associated with a respective mixer and receive an input signal therefrom. A digital signal processor receives signals from the digital radio frequency memories and outputs a single digital data stream indicative of measured phase noise. The digital radio frequency memories and digital signal processor may be part of a data acquisition and digital analysis subsystem. A test set controller converts information provided by or derived from digital analysis of the digital radio frequency memories into commands to change operation of the system or components thereof, including commands to the digital radio frequency memories and the local oscillator. A software program and/or algorithm employed by the test set controller enables generation of commands based on the analysis of the digital radio frequency memories.

In one configuration, the system is used to measure absolute phase noise of the RF signal being applied to the power divider and the digital radio frequency memories are configured to apply a different phase shift to the input signal, for example, by the test set controller. The digital signal processor performs a digital down-conversion of the phase-shifted signals and outputs a single digital data stream that represents the down-converted baseband containing phase noise content. A display is coupled to the digital signal processor and configured to display the down-converted baseband as measured phase noise content.

In another configuration, an RF signal source provides the input RF signal to the power divider and the system is configured to measure the phase noise added by a unit under test arranged between the power divider and one of the mixers. In this case, the digital radio frequency memories are configured to store received signals as in-phase and quadrature (I/O) data, thereby preserving a phase relationships of the received signals. As such, the digital radio frequency memories enable matching of signal paths to within 10 nSecs and perform digital signal processing to the received signals thereby replicating the phase shift such that output from the digital signal processor is a set of data depicting additive phase noise present in a signal path including the unit under test. A master clock provides clock signals to the local oscillator and the digital radio frequency memories. The RF signal source may be configured to generate a pulse modulated RF signal.

A radar environment simulator in accordance with the invention is shown schematically in FIG. 1 and includes a radar transmitter, a radar target display, a radar receiver that generates and provides signals to the radar target display to enable it to display a simulated target and clutter, and a phase noise test and diagnostic unit as described above. Each digital radio frequency memory is configured to receive a transmitted RF sample from the radar transmitter and output a simulated environment to the radar receiver. The test set controller is also configured to process feedback based on the simulated target and clutter on the radar target display and control each digital radio frequency memory based thereon. The test set controller may be configured via software and/or algorithms to derive a radar phase noise floor as a function of clutter range factor and loss of target detection.

A method for measuring phase noise may be practiced using the system and radar environment simulator described above. Alternatively, different sets of components may be used provided the components are capable of dividing an input RF signal into two components, separately mixing each of the signal components with a signal from a local oscillator or the like, and receiving signals from a respective digital radio frequency memory that receives one of the mixed signals and outputting a single digital data stream indicative of measured phase noise. Information provided by or derived from digital analysis of the digital radio frequency memories is converted into commands to change operation of the system and/or components thereof, e.g., the digital radio frequency memories.

When absolute phase noise of the RF signal being input to the power divider is measured, the digital radio frequency memories apply a different phase shift to the input signal and a digital down-conversion of the phase shifted signals is performed. As such, a single digital data stream that represents the down-converted baseband containing phase noise content is output.

When additive phase noise is measured and an RF signal source provides the input RF signal, a unit under test adds phase noise between the power divider and one of the mixers such that phase noise added by the unit under test is measured. In this case, the digital radio frequency memories store received signals as in-phase and quadrature (I/O) data, and a phase relationships of the received signals is preserved. The digital radio frequency memories enable matching of signal paths to within 10 nSecs and perform digital signal processing to the received signals thereby replicating the phase shift such that output from the digital signal processor is a set of data depicting additive phase noise present in a signal path including the unit under test.

The content of U.S. Pat. Nos. 5,179,344, 5,337,014, 6,057,690 and 6,480,006, all at least partly assigned to the assignee of this application, are incorporated by reference herein.

Several computer programs resident on transitory or non-transitory computer-readable media may be used in the invention and their function and non-limiting location are mentioned above. In the context of this document, computer-readable media or medium could be any non-transitory means that can contain, store, communicate, propagate or transmit a program for use by or in connection with the method, system, apparatus or device. The computer-readable medium can be, but is not limited to (not an exhaustive list), electronic, magnetic, optical, electromagnetic, infrared, or semi-conductor propagation medium. The medium can also be (not an exhaustive list) an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM). The medium can also be paper or other suitable medium upon which a program is printed, as the program can be electronically captured, via for example, optical scanning of the paper or other medium, then compiled, interpreted, or otherwise processed in a suitable manner, if necessary, and then stored in a computer memory. Also, a computer program or data may be transferred to another computer-readable medium by any suitable process such as by scanning the computer-readable medium.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. Indeed, it is envisioned that any feature shown in or described in connection with one embodiment may be applied to any of the other embodiments shown or described herein to the extent not inconsistent with a particular feature of that embodiment. Moreover, it is noted that the illustrated embodiments include two signal paths, each including a mixer, digital radio frequency memory, etc. This is not intended to limit the invention to only two signal paths.

We claims:

1. A system that measures phase noise, comprising:
a local oscillator;
a power divider for dividing an input RF signal from a source other than said local oscillator into two signal components that are output therefrom;
two mixers, each arranged in a path of a respective one of the signal components from said power divider, each mixer receiving a respective one of the signal components from said power divider and a signal from said local oscillator; and a data acquisition and digital analysis subsystem that receives analog signals from said mixers, converts the analog signals into digital signals and analyzes the digital signals, said data acquisition and digital analysis subsystem comprising:

two digital radio frequency memories, each associated with a respective one of said mixers and receiving an input signal therefrom; and a digital signal processor that receives signals from said two digital radio frequency memories and outputs a single digital data stream indicative of measured phase noise.

2. The system of claim 1, wherein said digital radio frequency memories are used together to ensure that pipeline delays of analog to digital conversion of the analog signals from said mixers are managed to keep the relative RF delay near a range of 1 msec.

3. The system of claim 1, further comprising a test set controller that converts information provided by or derived from digital analysis of said radio frequency memories into commands to change operation of the system or components thereof.

4. The system of claim 1, wherein the system is used to measure absolute phase noise of the input RF signal being provided to said power divider and said digital radio frequency memories are configured to apply a different phase shift to the input signal being received by each of said digital radio frequency memories, said digital signal processor performing a digital down-conversion of said phase shifted signals and outputting the single digital data stream that represents a down-converted baseband containing phase noise content.

5. The system of claim 4, further comprising a display coupled to said digital signal processor and configured to display the down-converted baseband as measured phase noise content.

6. The system of claim 3, wherein said test set controller is configured to control the RF signal source that provides the input RF signal to said power divider and the system is configured to measure phase noise added by a unit under test when arranged between said power divider and one of said mixers.

7. The system of claim 1, wherein the system is configured to measure phase noise added by a unit under test when arranged between said power divider and one of said mixers and each of said digital radio frequency memories is configured to store received signals as in-phase and quadrature (I/Q) data, preserving a phase relationships of the received signals, whereby said digital radio frequency memories enable matching of signal paths thereby replicating the phase shift such that output from said digital signal processor is a set of data depicting additive phase noise present in a signal path including the unit under test.

8. The system of claim 6, further comprising a master clock that provides clock signals to said local oscillator and said digital radio frequency memories.

9. The system of claim 6, wherein said RF signal source is configured to generate a pulse modulated RF signal.

10. A radar environment simulator, comprising:
a radar transmitter;
a radar target display;
a radar receiver that generates and provides signals to said radar target display to enable said radar target display to display a simulated target and clutter; and
a phase noise test and diagnostic unit including the system of claim 1, said digital radio frequency memories being configured to receive a transmitted RF sample from said radar transmitter and output a simulated environment to said radar receiver;
said test set controller being further configured to process feedback based on the simulated target and clutter on said radar target display and control said digital radio frequency memories.

11. The simulator of claim 10, wherein said test set controller is further configured to derive a radar phase noise floor as a function of clutter range factor and loss of target detection.

12. A method for measuring phase noise, comprising:
dividing an input RF signal into two signal components using a signal divider;
arranging a respective mixer in a path of each of the signal components, each mixer receiving a respective one of the signal components from the power divider and a signal from a local oscillator, the input RF signal divided by the signal divider being from an RF signal source different than the local oscillator;
providing analog signals from the mixers to a data acquisition and digital analysis subsystem that converts the analog signals into digital signals and analyzes the digital signals;
arranging a digital radio frequency memory in the data acquisition and digital analysis subsystem in a path from each of the mixers such that each digital radio frequency memory receives an input signal therefrom; and
receiving signals from the two digital radio frequency memories at a digital signal processor in the data acquisition and digital analysis subsystem that outputs a single digital data stream indicative of measured phase noise.

13. The method of claim 12, further comprising converting information provided by or derived from digital analysis of the digital radio frequency memories into commands at a test set controller.

14. The method of claim 12, wherein absolute phase noise of the RF signal being input to the power divider is measured, further comprising arranging the digital radio frequency memories to apply a different phase shift to the input signal being received by each of the digital radio frequency memories and configuring the digital signal processor to perform a digital down-conversion of the phase-shifted signals and output the single digital data stream that represents the down-converted baseband containing phase noise content.

15. The method of claim 14, further comprising coupling a display to the digital signal processor and displaying the down-converted baseband as measured phase noise content thereon.

16. The method of claim 12, wherein additive phase noise is measured, further comprising:
arranging an RF signal source to provide the input RF signal to the power divider; and
positioning a unit under test that adds phase noise between the power divider and one of the mixers such that phase noise added by the unit under test is measured.

17. The method of claim 16, wherein each of the digital radio frequency memories stores received signals as in-phase and quadrature (I/Q) data, preserve a phase relationships of the received signals, whereby the digital radio frequency memories enable matching of signal paths thereby replicating the phase shift such that output from the digital signal processor is a set of data depicting additive phase noise present in a signal path including the unit under test.

18. The method of claim 16, further comprising providing a master clock that generates clocks signals for the local oscillator and the digital radio frequency memories.

19. The method of claim 16, wherein the RF signal source is configured to generate a pulse modulated RF signal.

20. The system of claim 1, wherein said data acquisition and digital analysis subsystem is configured to apply a phase shift to a signal being processed by one of said digital radio frequency memory relative to a signal being processed by the other of said digital radio frequency memory depending on a type of phase noise being measured.

* * * * *